US012134180B2

(12) United States Patent
Burns et al.

(10) Patent No.: US 12,134,180 B2
(45) Date of Patent: Nov. 5, 2024

(54) MODULAR TOOL CONTAINER

(71) Applicant: MILWAUKEE ELECTRIC TOOL CORPORATION, Brookfield, WI (US)

(72) Inventors: Courtney J. Burns, Wauwatosa, WI (US); Michael J. Zimmermann, New Berlin, WI (US); Steven W. Hyma, Milwaukee, WI (US); Michael D. Huh, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 7 days.

(21) Appl. No.: 17/912,883

(22) PCT Filed: Apr. 9, 2021

(86) PCT No.: PCT/US2021/026584
§ 371 (c)(1),
(2) Date: Sep. 20, 2022

(87) PCT Pub. No.: WO2021/207603
PCT Pub. Date: Oct. 14, 2021

(65) Prior Publication Data

US 2023/0141683 A1 May 11, 2023

Related U.S. Application Data

(60) Provisional application No. 63/007,581, filed on Apr. 9, 2020.

(51) Int. Cl.
*B25H 3/02* (2006.01)
*A45C 13/02* (2006.01)
(Continued)

(52) U.S. Cl.
CPC ............... *B25H 3/02* (2013.01); *A45C 13/02* (2013.01); *B65D 21/0223* (2013.01); *B65D 43/16* (2013.01); *B65D 25/28* (2013.01)

(58) Field of Classification Search
CPC ...... B25H 3/02; A45C 13/02; B65D 21/0223; B65D 43/16; B65D 25/28
See application file for complete search history.

(56) References Cited

U.S. PATENT DOCUMENTS

| | | |
|---|---|---|
| 2,341,635 A | 2/1944 | Loesch |
| D171,132 S | 12/1953 | Hudson |

(Continued)

FOREIGN PATENT DOCUMENTS

| | | |
|---|---|---|
| CN | 201098890 Y | 8/2008 |
| CN | 103372858 A | 10/2013 |

(Continued)

OTHER PUBLICATIONS

Australian Patent Office Action for Application No. 2023100026 dated Apr. 21, 2023 (5 pages).

(Continued)

*Primary Examiner* — Robert J Hicks
*Assistant Examiner* — Sanjidul Islam
(74) *Attorney, Agent, or Firm* — Michael Best & Friedrich LLP

(57) ABSTRACT

A tool case including a base having a lower surface and a tool holder insert supported by the base. The lower surface of the base defines a plurality of guides. The tool holder insert includes a base portion, an insert portion extending from the base portion in a first direction, a main body portion extending from the base portion in a second direction that is opposite the first direction, and a wing extending outwardly from the base portion. The insert portion engages one of the plurality of guides. The main body portion is configured to receive an oscillating multi tool blade, and the wing has a detent that engages another of the plurality of guides.

20 Claims, 9 Drawing Sheets

(51) Int. Cl.

| | |
|---|---|
| ***B65D 21/02*** | (2006.01) |
| ***B65D 25/28*** | (2006.01) |
| ***B65D 43/16*** | (2006.01) |

(56) References Cited

U.S. PATENT DOCUMENTS

| | | | |
|---|---|---|---|
| 3,804,234 | A | 4/1974 | Gordon |
| 3,878,939 | A | 4/1975 | Wilcox |
| 4,033,455 | A | 7/1977 | Robison |
| 4,253,830 | A | 3/1981 | Kazen et al. |
| 4,424,899 | A | 1/1984 | Rosenberg |
| 4,798,292 | A | 1/1989 | Hauze |
| 4,871,354 | A | 10/1989 | Conn et al. |
| 4,896,771 | A | 1/1990 | Edwards |
| 5,047,019 | A | 9/1991 | Sincock |
| D323,245 | S | 1/1992 | Hobson |
| 5,133,455 | A | 7/1992 | Chow |
| 5,165,539 | A | 11/1992 | Weber et al. |
| D335,434 | S | 5/1993 | Someya |
| 5,353,930 | A | 10/1994 | Berry, Jr. |
| D351,994 | S | 11/1994 | Kalvelage |
| 5,398,810 | A | 3/1995 | Yao Wang |
| 5,424,048 | A | 6/1995 | Riley |
| 5,464,091 | A | 11/1995 | Callahan et al. |
| 5,570,784 | A | 11/1996 | Sidabras et al. |
| 5,676,254 | A | 10/1997 | Cheng et al. |
| 5,762,211 | A | 6/1998 | Ensign |
| 5,766,561 | A | 6/1998 | Frieze et al. |
| D397,246 | S | 8/1998 | Hoofnagle et al. |
| 5,823,332 | A | 10/1998 | Clausen |
| 5,826,719 | A | 10/1998 | Chen |
| 5,855,274 | A | 1/1999 | Piao |
| 6,109,436 | A | 8/2000 | He |
| 6,213,296 | B1 | 4/2001 | Streich et al. |
| 6,331,280 | B1 | 12/2001 | Wood |
| 6,391,260 | B1 | 5/2002 | Davis et al. |
| 6,405,864 | B1 | 6/2002 | Streich et al. |
| 6,415,922 | B1 | 7/2002 | Lee |
| 6,470,930 | B1 | 10/2002 | Stottmann |
| 6,634,728 | B1 | 10/2003 | Leguin |
| D482,255 | S | 11/2003 | Winig et al. |
| D488,300 | S | 4/2004 | Lopez |
| 6,755,302 | B1 | 6/2004 | Streich et al. |
| D494,035 | S | 8/2004 | Winig et al. |
| D494,036 | S | 8/2004 | Winig et al. |
| D495,067 | S | 8/2004 | Winig et al. |
| 6,769,538 | B2 | 8/2004 | Oswald |
| D498,005 | S | 11/2004 | Winig et al. |
| D501,125 | S | 1/2005 | Winig et al. |
| 6,953,114 | B2 | 10/2005 | Wang |
| 6,991,103 | B2 | 1/2006 | Chen |
| 7,048,133 | B2 | 5/2006 | Pangerc et al. |
| D545,160 | S | 6/2007 | Lee |
| 7,246,704 | B2 | 7/2007 | Brunson et al. |
| 7,341,148 | B2 | 3/2008 | Bettenhausen et al. |
| 7,434,688 | B2 | 10/2008 | Hu |
| 7,520,386 | B1 | 4/2009 | Griffin |
| 7,601,312 | B2 | 10/2009 | Riley et al. |
| 7,900,771 | B1 | 3/2011 | Meng |
| 7,931,143 | B1 | 4/2011 | Lin |
| 7,946,418 | B1 | 5/2011 | Cerynik |
| D645,322 | S | 9/2011 | Hamm et al. |
| 8,069,984 | B2 | 12/2011 | Larson et al. |
| 8,235,212 | B2 | 8/2012 | Heerens |
| 8,251,211 | B1 | 8/2012 | Chen et al. |
| 8,336,708 | B2 | 12/2012 | Potterfield et al. |
| 8,371,444 | B1 | 2/2013 | Huang |
| D679,908 | S | 4/2013 | Hurt et al. |
| 8,505,720 | B2 | 8/2013 | Huang |
| 8,915,363 | B2 | 12/2014 | Hawkes et al. |
| D725,388 | S | 3/2015 | Cole |
| 8,992,229 | B2 | 3/2015 | Spital |
| 9,132,932 | B2 | 9/2015 | Scharfe et al. |
| 9,156,156 | B2 | 10/2015 | Wang |
| 9,156,157 | B2 | 10/2015 | Wang |
| RE45,787 | E | 11/2015 | Hurt et al. |
| 9,198,811 | B2 | 12/2015 | Pizzato et al. |
| 9,254,565 | B1 | 2/2016 | Wang |
| D757,435 | S | 5/2016 | Damberg |
| 9,375,835 | B1 | 6/2016 | Lin |
| 9,421,685 | B2 | 8/2016 | Meyers |
| 9,486,912 | B1 | 11/2016 | Chen |
| 9,610,126 | B2 | 4/2017 | Griffin |
| 9,656,384 | B1 | 5/2017 | Tsai |
| 9,694,489 | B2 | 7/2017 | Steele et al. |
| D814,567 | S | 4/2018 | Franklin |
| 9,975,237 | B2 | 5/2018 | Norris |
| 10,058,230 | B2 | 8/2018 | Gobl |
| 10,266,305 | B2 | 4/2019 | Lee et al. |
| 10,286,541 | B2 | 5/2019 | Huang |
| 10,629,335 | B2 * | 4/2020 | Rouleau ........... H01B 13/01209 |
| 10,772,447 | B2 | 9/2020 | Roaks |
| D928,630 | S | 8/2021 | Liu |
| 11,358,272 | B2 | 6/2022 | Bühl et al. |
| 11,504,994 | B1 | 11/2022 | Leinbach et al. |
| D981,811 | S | 3/2023 | Spears |
| 2003/0213876 | A1 * | 11/2003 | Takeuchi ................. H05K 7/12 248/74.1 |
| 2003/0221984 | A1 | 12/2003 | Huang |
| 2004/0134818 | A1 | 7/2004 | Cunningham et al. |
| 2005/0133394 | A1 | 6/2005 | Liu |
| 2005/0211587 | A1 | 9/2005 | Chen |
| 2005/0241974 | A1 | 11/2005 | Chen |
| 2006/0011624 | A1 | 1/2006 | Shih |
| 2006/0070900 | A1 | 4/2006 | Brunson et al. |
| 2007/0272572 | A1 | 11/2007 | Chen |
| 2008/0060960 | A1 | 3/2008 | Hu |
| 2009/0045090 | A1 | 2/2009 | Zhang |
| 2009/0146032 | A1 | 6/2009 | Bettenhausen et al. |
| 2009/0211932 | A1 | 8/2009 | Schmitt et al. |
| 2009/0288974 | A1 | 11/2009 | Pistor et al. |
| 2010/0140126 | A1 | 6/2010 | Lu et al. |
| 2011/0031145 | A1 | 2/2011 | Larson et al. |
| 2011/0111378 | A1 | 5/2011 | Nguyen |
| 2011/0233096 | A1 | 9/2011 | Michels et al. |
| 2011/0290697 | A1 | 12/2011 | Dalhamer |
| 2012/0043238 | A1 | 2/2012 | Christopher |
| 2013/0118938 | A1 | 5/2013 | Huang |
| 2014/0166516 | A1 | 6/2014 | Martinez et al. |
| 2014/0231307 | A1 | 8/2014 | Wen |
| 2014/0340034 | A1 | 11/2014 | Dietzel et al. |
| 2015/0258676 | A1 | 9/2015 | Wang |
| 2015/0258677 | A1 | 9/2015 | Wang |
| 2016/0052125 | A1 | 2/2016 | Steele et al. |
| 2016/0053987 | A1 | 2/2016 | Hsu |
| 2016/0075010 | A1 | 3/2016 | Gonzales et al. |
| 2016/0107308 | A1 | 4/2016 | Hsu |
| 2016/0290013 | A1 | 10/2016 | Lin |
| 2016/0346915 | A1 | 12/2016 | Lin |
| 2017/0165829 | A1 | 6/2017 | Damberg |
| 2017/0259424 | A1 | 9/2017 | Vetter et al. |
| 2017/0341218 | A1 | 11/2017 | Maruzzo et al. |
| 2017/0361454 | A1 | 12/2017 | Hsu |
| 2018/0250759 | A1 | 9/2018 | Hyma et al. |
| 2019/0351540 | A1 | 11/2019 | Lamb |
| 2020/0039057 | A1 | 2/2020 | Bühl et al. |
| 2020/0180138 | A1 | 6/2020 | D'Alessandro |
| 2020/0200340 | A1 | 6/2020 | Pugh, II et al. |
| 2020/0238501 | A1 | 7/2020 | Baum |
| 2021/0078159 | A1 | 3/2021 | Jiang |
| 2021/0146525 | A1 | 5/2021 | Spaulding, Jr. et al. |
| 2021/0197360 | A1 | 7/2021 | Zhang |
| 2021/0245358 | A1 | 8/2021 | Hohl et al. |
| 2021/0387325 | A1 | 12/2021 | Heath et al. |
| 2022/0355464 | A1 | 11/2022 | La Vardera |

FOREIGN PATENT DOCUMENTS

| | | | |
|---|---|---|---|
| CN | 206326579 | U | 7/2017 |
| CN | 111846612 | A | 10/2020 |
| DE | 202015100103 | U1 | 2/2015 |
| DE | 102015105402 | A1 | 3/2016 |
| EP | 1803517 | A1 | 7/2007 |
| EP | 2913280 | A1 | 9/2015 |

(56) References Cited

FOREIGN PATENT DOCUMENTS

| | | | |
|---|---|---|---|
| EP | 2551067 | B1 | 5/2016 |
| JP | 2002144258 | A | 5/2002 |
| KR | 2019950010112 | Y1 | 11/1995 |
| RU | 00137828 | | 8/2023 |
| WO | 0009421 | A1 | 2/2000 |
| WO | 2018007962 | A1 | 1/2018 |
| WO | 2020055726 | A1 | 3/2020 |

OTHER PUBLICATIONS

Australian Patent Office Action for Application No. 2022100154 dated Mar. 28, 2023 (5 pages).

Extended European Search Report for Application No. 21784837.3 dated Jan. 5, 2024 (9 pages).

Bosch, "Bosch 2608580871 Hole Saw Set Speed for Multi-Construction (9-Piece)" <https://www.amazon.co.uk/Bosch-2608580871-Speed-Multi-Construction-9-Piece/dp/B00OWMC13E/ref . . . > web page publicly available at least as early as Jan. 22, 2018.

International Search Report and Written Opinion for Application No. PCT/US2021/026584 dated Jul. 16, 2021 (12 pages).

IKEA, "SKADIS Pegboard, black, 30x22," <https://www.ikea.com/us/en/p/skadis-pegboard-black-50534378/?> web page visited Sep. 5, 2023 (3 pages).

ToolGuyd, "Milwaukee 20pc Oscillating Multi-Tool Accessory Kit with New Customizable Case," <https://toolguys.com/milwaukee-20pc-oscillating-multi-tool-blades-h2021/> web page visited Sep. 5, 2023 (3 pages).

Kole Imports and Closeouts, "Deisgn-Your-Own Peg Board Storage Set with Containers and Hooks," <https://koleimports.com/peg-board-storage-board-set-hc501?gad=1&> web page visited Sep. 5, 2023 (3 pages).

John L., "Oscillating Blade Storage Box," <https://www.printables.com/model/323279-oscillating-blade-storage-box> dated Dec. 1, 2022 (6 pages).

* cited by examiner

MODULAR TOOL CONTAINER

CROSS-REFERENCE TO RELATED APPLICATION

This application is a national stage filing under 35 U.S.C. § 371 of International Application No. PCT/US2021/026584, filed Apr. 9, 2021, which claims priority to U.S. Provisional Patent Application No. 63/007,581, filed Apr. 9, 2020, the entire contents of all of which are incorporated herein by reference.

BACKGROUND

The application relates to a tool accessory container or case, and more specifically, to an oscillating multi tool accessory container or case with modular components allowing for user customization.

Generally, oscillating multi tool (OMT) accessories and blades are stored within a container or case. Such containers/cases may include holders for supporting accessories and/or blades within the container/case to prevent the accessories and/or blades from moving within the container/case.

SUMMARY

In one embodiment, the invention provides a tool case including a base having a lower surface and a tool holder insert supported by the base. The lower surface of the base defines a plurality of guides. The tool holder insert includes a base portion, an insert portion extending from the base portion in a first direction, a main body portion extending from the base portion in a second direction that is opposite the first direction, and a wing extending outwardly from the base portion. The insert portion engages one of the plurality of guides. The main body portion is configured to receive an oscillating multi tool blade, and the wing has a detent that engages another of the plurality of guides.

In another embodiment, the invention provides a tool case including a base having a lower surface and a tool holder insert supported by the base. The lower surface of the base defines a plurality of guides. The tool holder insert includes a base portion, an insert portion extending from the base portion in a first direction and a main body portion extending from the base portion in a second direction that is opposite the first direction. The insert portion engages one of the plurality of guides. The main body portion includes a projection that forms a resting surface configured to support an offset anchor of an oscillating multi tool blade.

In another embodiment, the invention provides a tool case including a base including a lower surface and walls extending away from the lower surface. The lower surface and the walls define a cavity and the lower surface defines a plurality of double bayonet channels. The tool case further includes a lid coupled to the base to selectively enclose the cavity, and a tool holder insert supported by the base and positioned within the cavity. The tool holder insert includes a base portion, an insert portion extending from the base portion in a first direction, and a main body portion extending from the base portion in a second direction that is opposite the first direction. The insert portion has a double bayonet projection that is received in one of the plurality of double bayonet channels. The main body portion includes a plurality of ridges that extend along the main body portion from the base portion to a top of the tool holder insert. The main body portion also includes a projection between two ridges of the plurality of ridges, and the projection forms a resting surface that is configured to support an offset anchor of an oscillating multi tool blade. The tool holder further includes a wing that extends outwardly from the base portion and has a detent that engages another of the plurality of double bayonet channels.

In still another embodiment, the invention provides a tool holder insert for use with a tool case. The tool holder insert includes a main body portion and a tool mount portion extending from the main body portion in a first direction. The tool mount portion is configured to receive an oscillating multi tool blade. The tool holder insert also includes an insert portion configured to engage the tool case. The tool holder further includes a spring positioned around a portion of the main body portion, a sleeve that surrounds the spring, and a retaining member for receiving a force from the spring to retain the tool blade.

In yet another embodiment, the invention provides a tool holder insert for use with a tool case. The tool holder insert includes a casing, an insert portion, a cap, a spring, and a retaining member. The insert portion is configured to engage the tool case. The cap is housed within the casing for supporting an offset anchor of an oscillating multi tool blade. The spring lies between the cap and the casing for urging the cap away from the casing, and the retaining member inhibits the cap from separating from the casing.

In yet another embodiment, the invention provides a tool case including a base, a lid, and a tool holder insert. The tool holder insert is repositionable within the tool case.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1A:
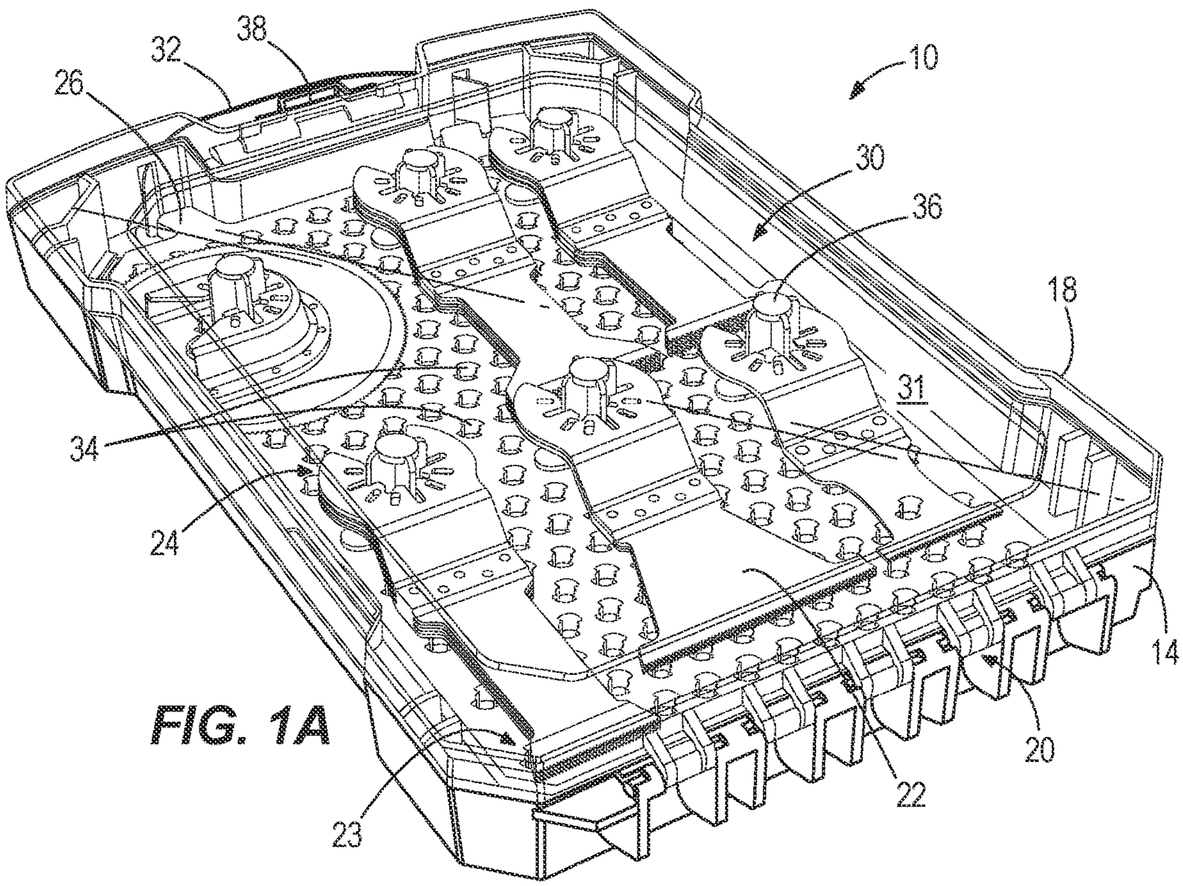
FIG. 1A is a perspective view of a tool container.
Figure 1B:
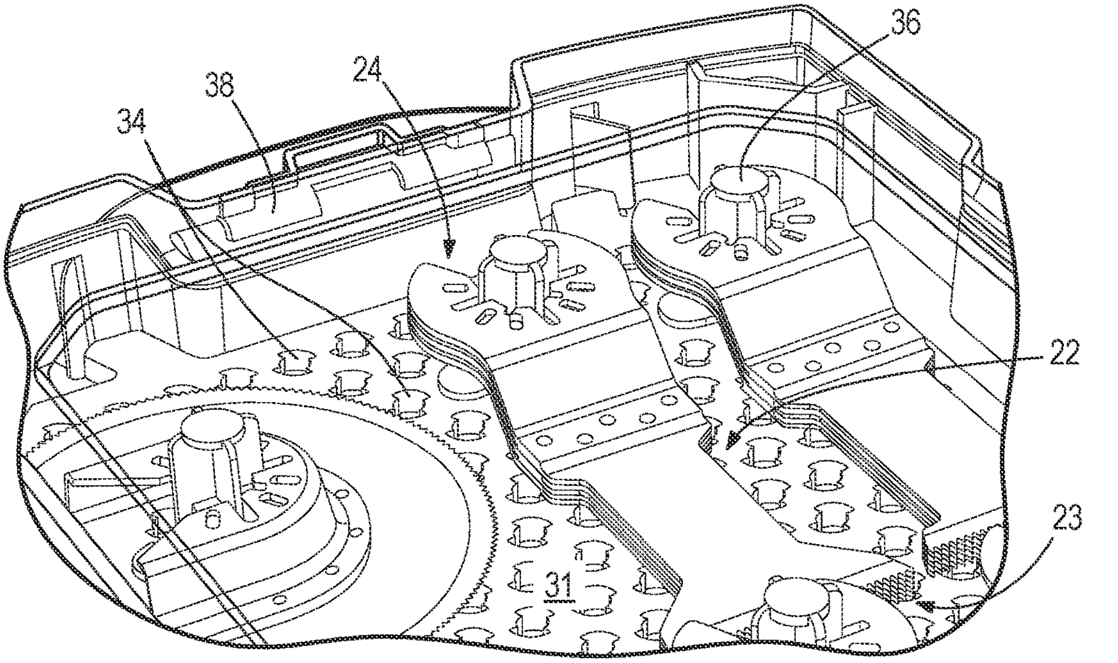
FIG. 1B is an enlarged view of a portion of the tool container of FIG. 1A.

As shown in FIGS. 1A-3, a tool container or case 10 includes a base 14 coupled to a lid 18 by a hinge 20. The case 10 may be stacked with one or more other cases 10, or even stacked with multiple cases included in Milwaukee Electric Tool Company's PACKOUT™ platform. The case 10 may also be stored within other, larger tool cases. In general, the case 10 is used for storing oscillating multi tool (OMT) blades and accessories 22 (FIGS. 1A and 1B). Typically, OMT blades and accessories 22 include a first portion 23 for engaging a work piece and a second portion 24 (e.g., an offset anchor) for engaging and/or accommodating mounting to an OMT.

The base 14 includes a first or lower surface 26 and walls 30 extending away from the lower surface 26. The lower surface 26 and the walls 30 define a cavity 31. In some embodiments, the lower surface 26 is a separate element from the base 14, such as a tray, panel, or the like that is selectively insertable into the cavity 31 and removable from the base 14. A handle 32 is coupled to at least one of the walls 30 or to the lid 18. The case 10 also includes guides 34 positioned adjacent to the lower surface 26. The guides 34 form apertures or openings in the lower surface 26.

In the illustrated embodiment, the guides 34 are formed directly on the lower surface 26. Each guide 34 is generally circular in shape and includes a channel 35 (FIG. 8). In the illustrated embodiment, the channel 35 is a double bayonet channel 35, but could alternatively be a single bayonet channel. As shown in FIG. 2B, the guides 34 are arranged in rows along the lower surface 26. The guides 34 may also be aligned in columns and/or arranged in a grid. Each guide 34 may receive a tool holder insert 36. The tool holder insert 36 may also be referred to as a pin or a peg. Each peg 36, which will be described further below, includes a projection 37 complementary to the double bayonet channel 35 (FIGS. 6A-8). Each peg 36 is configured to receive the second portion 24 (i.e., tool mounting portion) of an OMT blade or accessory 22.

Referring back to FIGS. 1A-2D, the base 14 further includes a latch 38 disposed on one wall 30, and the lid 18 includes a latch receiving portion 40. In some embodiments, the latch 38 may be disposed on the lid 18, and the latch receiving portion 40 may be formed on the base 14. The latch 38 is movable (e.g., slidable, pivotable, detachable, etc.) relative to the wall 30 and selectively engaged with the latch receiving portion 40 to retain the lid 18 to the base 14 in a closed position (FIG. 1). When the latch 38 is disengaged from the latch receiving portion 40, the lid 18 may be pivoted about the hinge 20 into an open position. The lid 18 may be pivoted about the hinge 20 from 0 degrees (i.e., closed position) to 180 degrees.

Figure 2A:
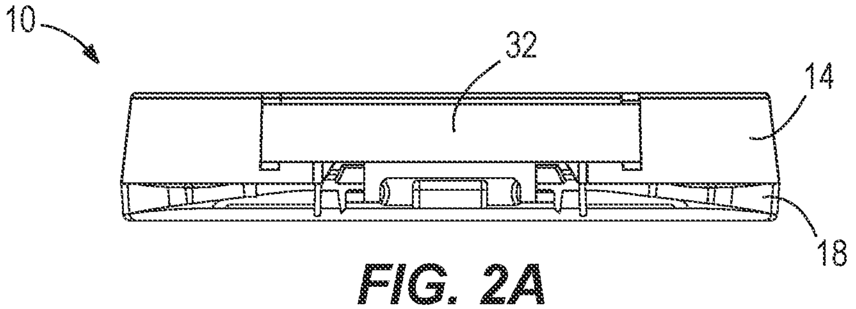
FIG. 2A is an end view of the tool container of FIG. 1A.
Figure 2B:
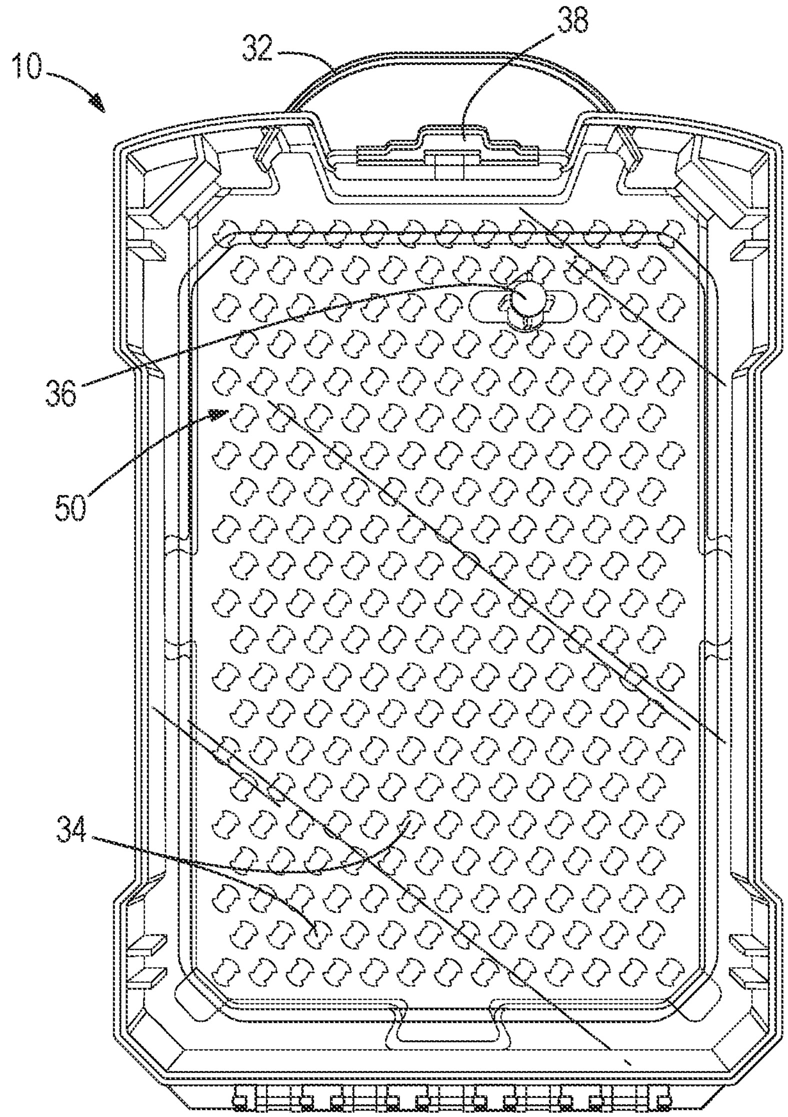
FIG. 2B is a top view of the tool container of FIG. 1A.
Figure 2C:
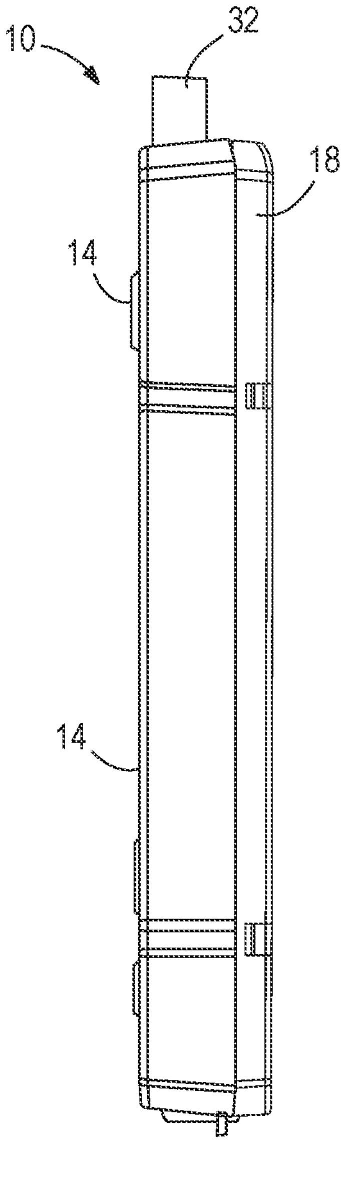
FIG. 2C is a side view of the tool container of FIG. 1A.
Figure 2D:
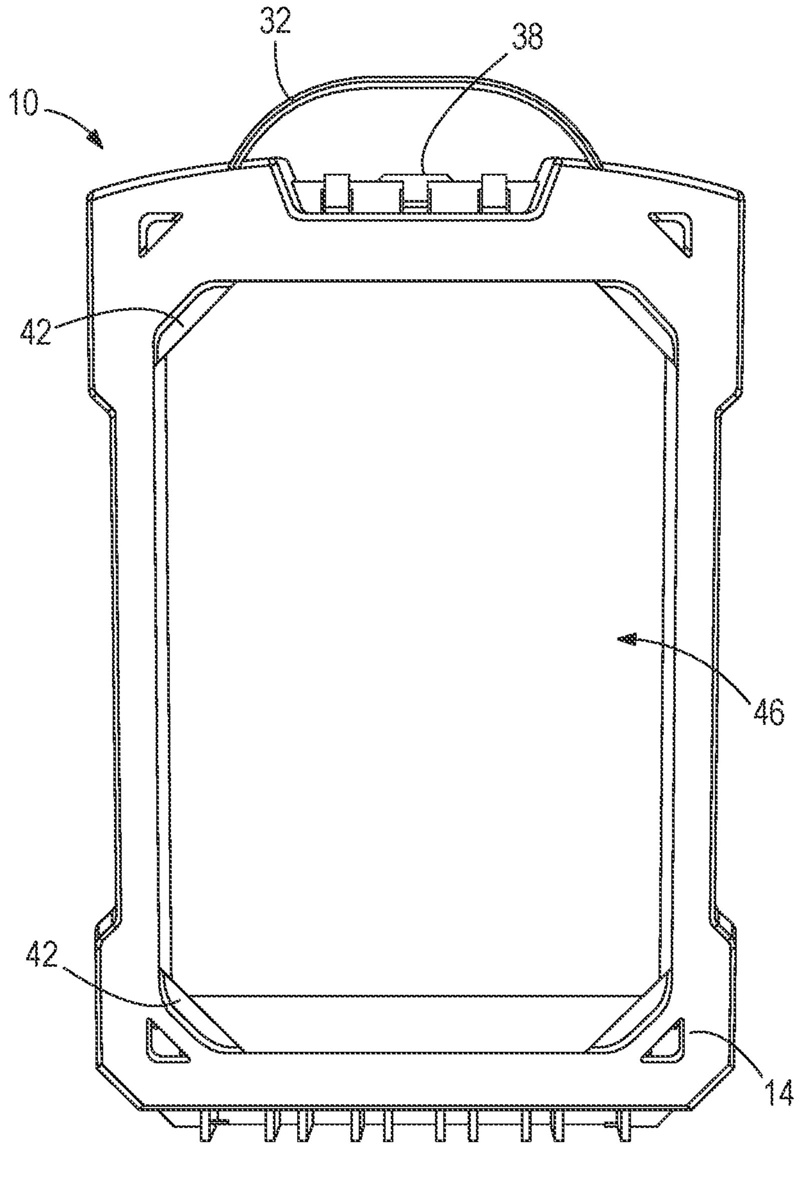
FIG. 2D is a bottom view of the tool container of FIG. 1A.
Figure 3:
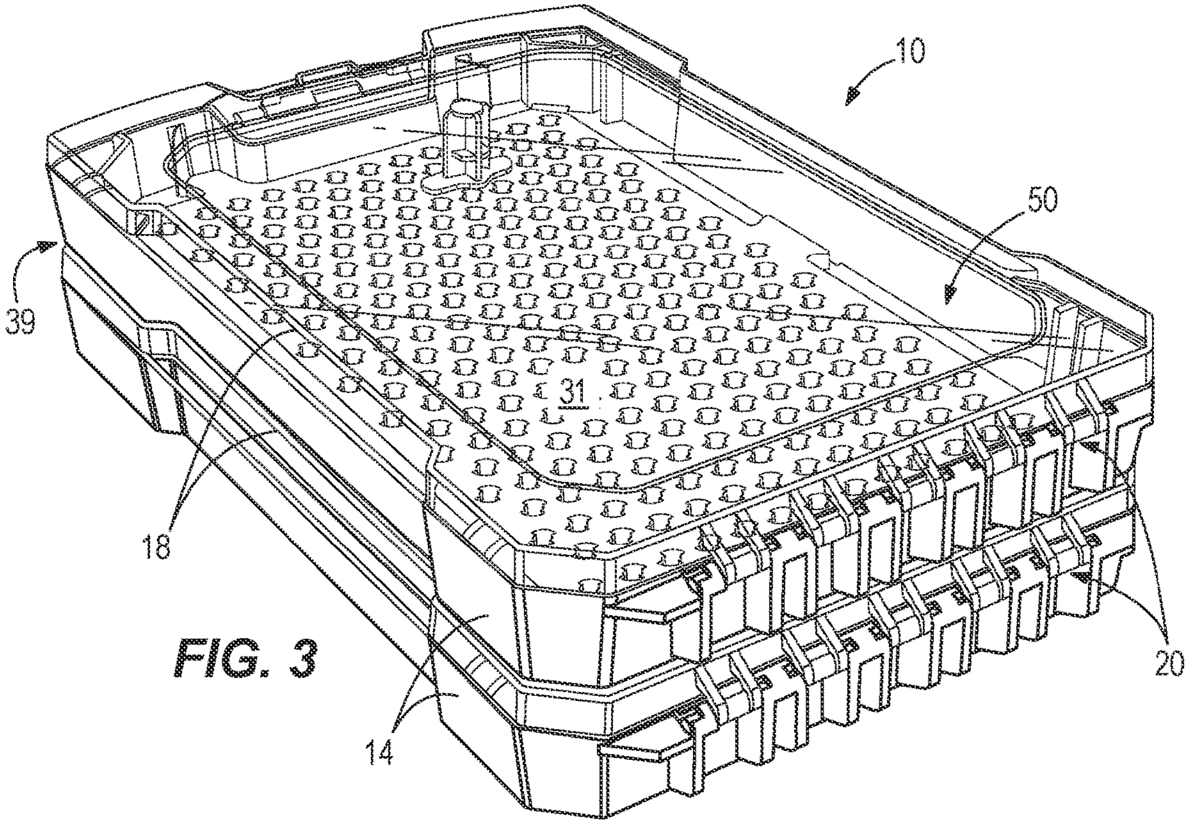
FIG. 3 is a perspective view of multiple tool containers of FIG. 1A stacked together.

Referring now to FIGS. 2A-3, the case 10 is stackable with other cases 10 at an interface 39 (FIG. 3) between the base 14 of one case 10 and the lid 18 of another case 10. In some constructions of the case, the interface is compatible with the PACKOUT™ platform referenced above. The base 14 includes feet 42 for stabilizing the case 10 on a surface. The feet 42 extend away from the base 14 and have a trapezoidal profile. The base 14 also includes a generally rectangular recess 46. The feet 42 are positioned on the base 14 and form corners of the rectangular recess 46 (FIG. 2D).

The lid 18 also includes a generally rectangular recess 50. Each corner of the recess 50 is formed to match the shape of the feet 42 such that when the base 14 of one case 10 is placed on the lid 18 of another case 10, the feet 42 of the base 14 may be received in the recess 50 formed on the lid 18 and inhibit movement of the cases 10 in a horizontal plane (i.e., generally parallel to the interface 39). The recesses 46, 50 are also configured to receive decals and or merchandising/product information.

Referring now to FIGS. 4-8, each peg 36 includes a base portion 52, an insert portion 54 extending from the base portion 52 in a downward direction 55D (FIG. 6B), and a main body portion 58. At least two wings 62 extend outwardly from the base 52 along a first axis 64 (FIG. 6B). In the illustrated embodiment, the wings 62 are generally planer (e.g., extending in a planer manner relative the first axis). In another embodiment, three or four wings extend outwardly from the base along the first axis. In yet another embodiment, the peg 36 includes a singular, generally circumferential wing that extends outwardly from the base portion 52 in a plane parallel to the first axis 64.

The first axis 64 is substantially perpendicular to a central longitudinal axis of the main body portion 58. Each wing 62 includes rounded detents, bumps, or nubs 66 that extend from the wings 62 in the downward direction 55D (FIG. 6B). The insert portion 54 includes the projection 37 that corresponds to the double bayonet channel 35. In the illustrated embodiment, the projection 37 is a double bayonet projection complimentary to the double bayonet channel 35. In other embodiments, the projection 37 could be a single bayonet projection complimentary to a bayonet channel or the double bayonet channel 35. The pegs 36 are removably attachable to the guides 34 via rotational engagement between the double bayonet projection 37 and the double bayonet channel 35. When the peg 36 is rotated within one of the guides 34, the nubs 66 may also be rotated to engage (e.g., slide, snap, etc.) with adjacent guides 34 (FIG. 8). In one example construction, the wings 62 may be at least partially flexible such that the wings 62 may deflect away from the tool case 10 until the nubs 66 snap, shift, etc. into adjacent guides 34.

When engaged, the nubs 66 inhibit the peg 36 from unintentionally rotating relative to the guide 34. In other words, a user may initiate inserting one of the insert portions 54 of the pegs 36 into one of the guides 34, and then the user may rotate the peg 36 to engage the double bayonet projection 37 with the double bayonet channel 35 to lock/secure the peg 36 into the guide 34. As the peg 36 is rotated, the nubs 66 are also rotated into adjacent guides 34, thereby securing the peg 36 to the base 14. Stated yet another way, engagement between the double bayonet projection 37 and the double bayonet channel 35 inhibits the peg 36 from being moved in the upward-downward direction 55U-55D relative the case 10, while engagement between the nubs 66 and the adjacent guides 34 resists rotation of the peg 36 relative the case 10.

Figure 6A:
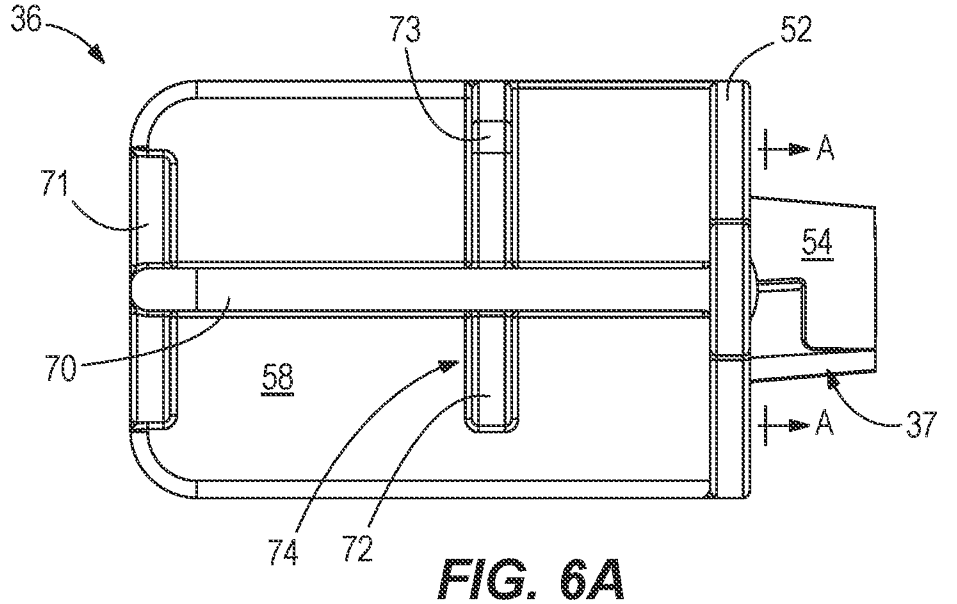
FIG. 6A is a first side view of the tool holder insert of FIG. 4.
Figure 6B:
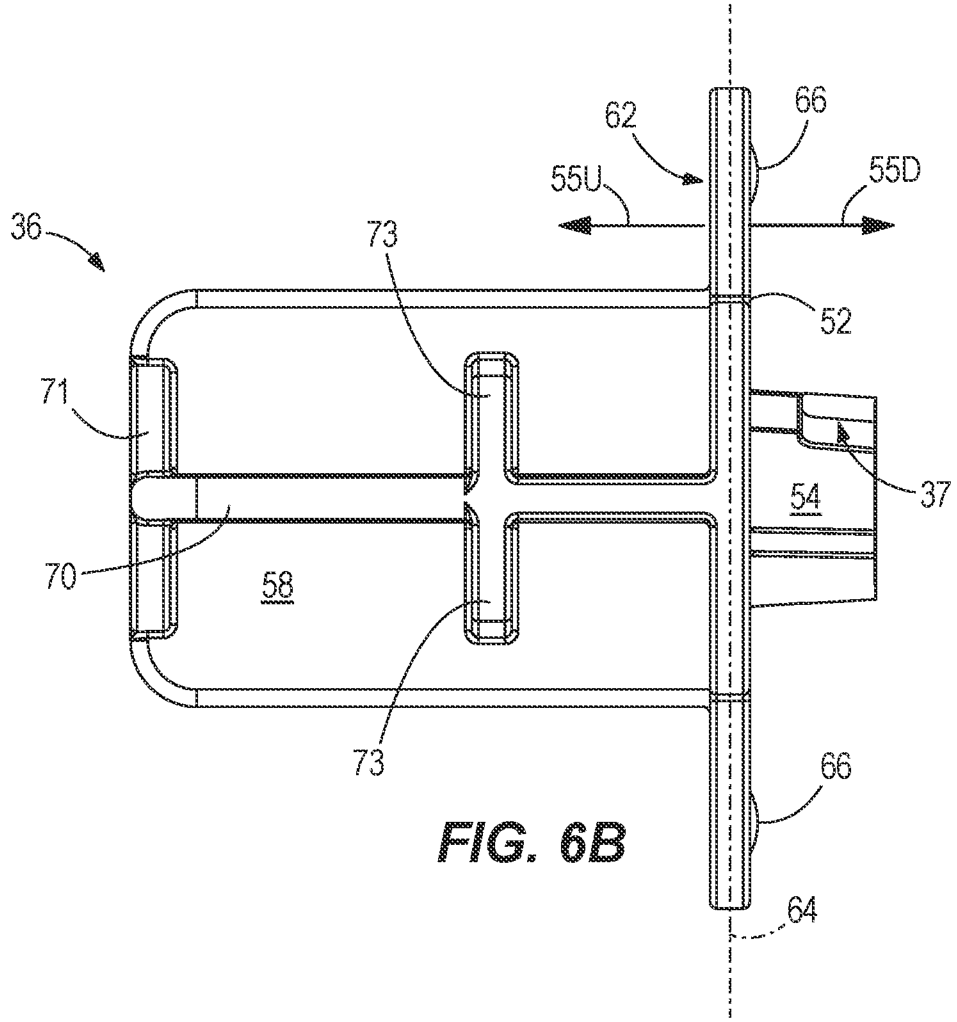
FIG. 6B is a second side view of the tool holder insert of FIG. 4
Figure 7:
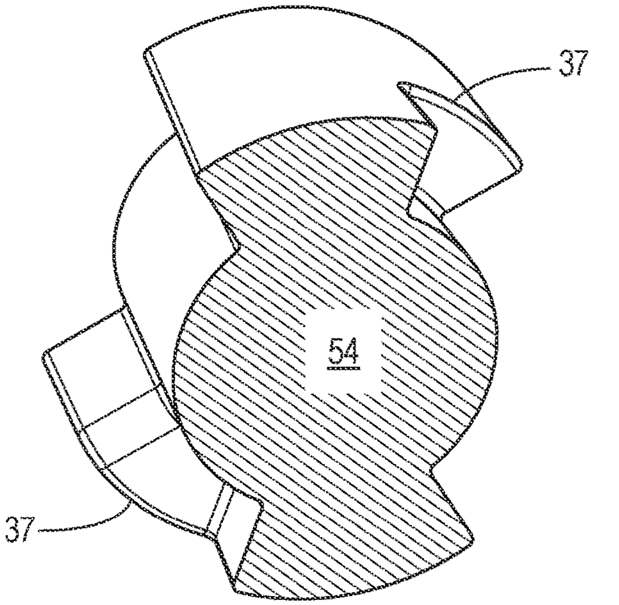
FIG. 7 is a perspective cross-sectional view of a portion of the tool holder insert of FIG. 6A taken through section line A-A.
Figure 8:
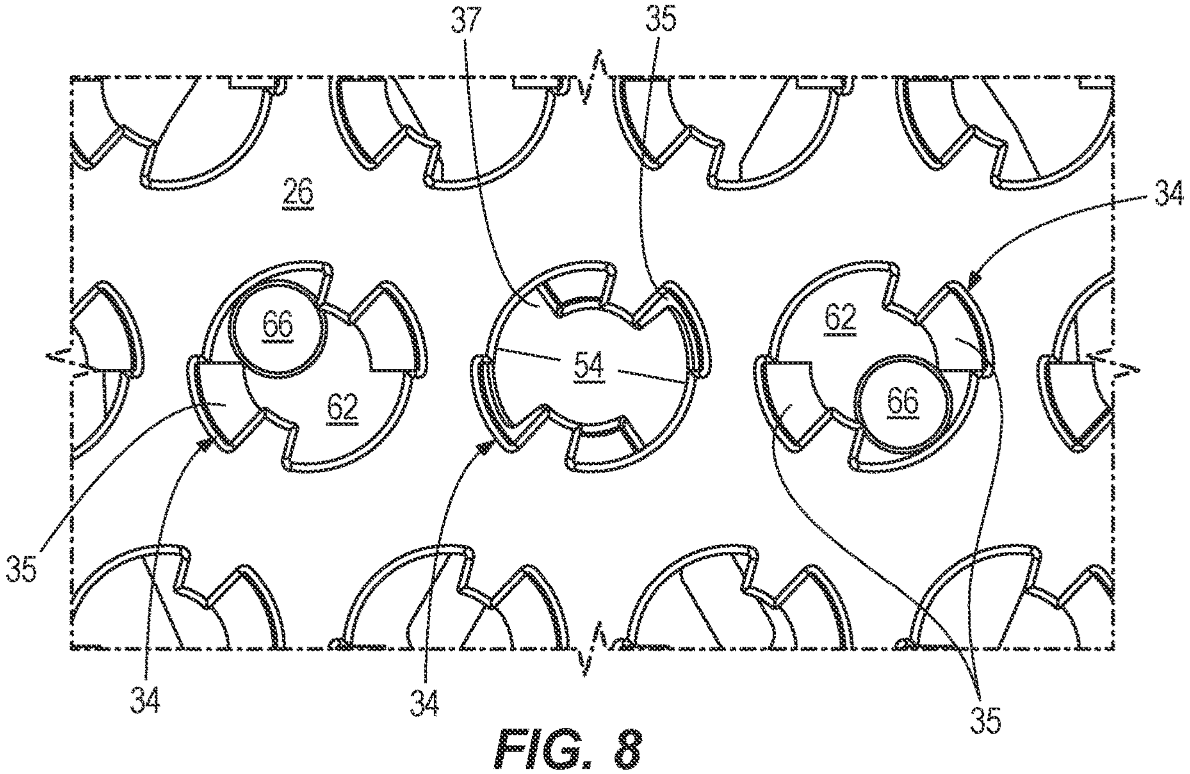
FIG. 8 is a bottom view of the tool holder insert of FIG. 4 mated with a portion of the container of FIG. 1A.

Referring to FIGS. 5A-8, the double bayonet projection 37 of the insert portion 54, when taken through section line A-A, has a X-shaped cross section (FIG. 7). The guides 34, which are recessed from the lower surface 26, also have a similar X-shaped cross section (FIG. 8). In the illustrated embodiment, the X-shaped cross sections are generally narrow, but could alternately be generally equilateral X-shaped cross sections. As illustrated in FIGS. 7 and 8, the double bayonet channels 35 and the double bayonet projections 37 are configured to correspond with and engage one another. The peg 36 is, therefore, positionable in any channel 35 of the case 10 such that the peg 36 is selectively repositionable within the case 10.

Figure 4:
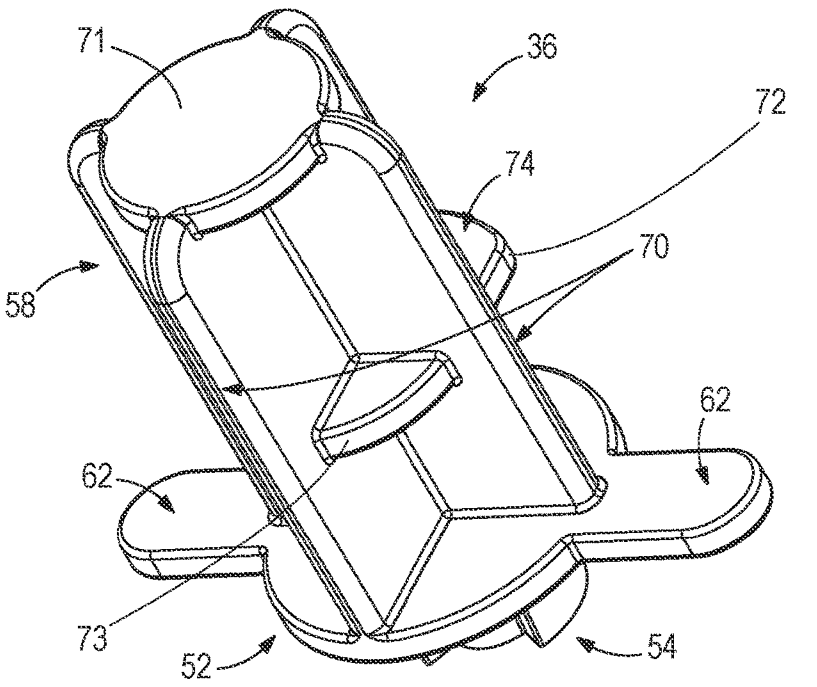
FIG. 4 is a perspective view of a tool holder insert for the tool container of FIG. 1A.
Figure 5A:
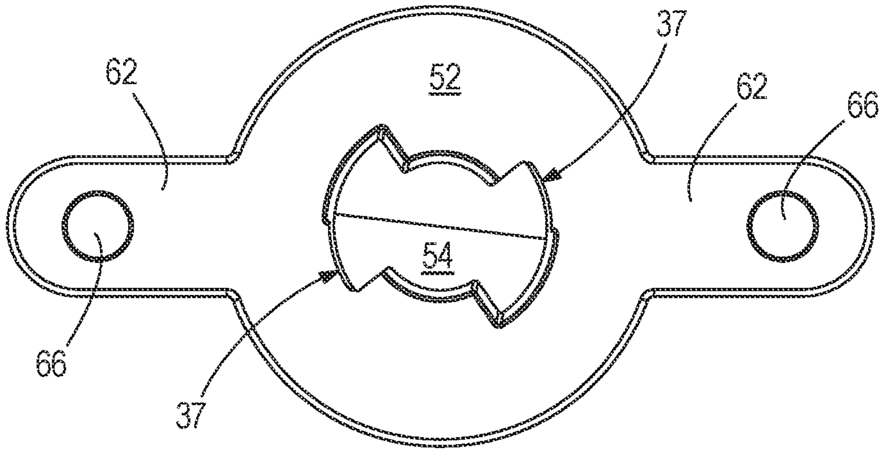
FIG. 5A is a bottom view of the tool holder insert of FIG. 4.
Figure 5B:
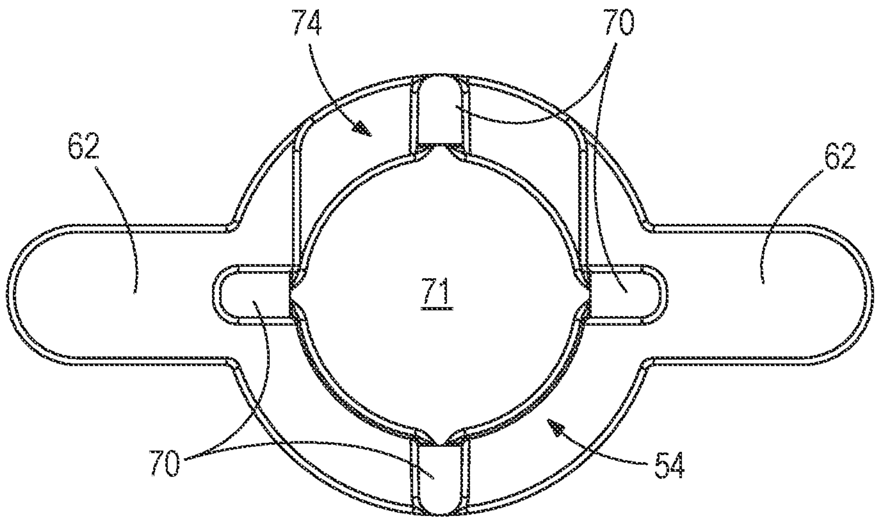
FIG. 5B is a top view of the tool holder insert of FIG. 4.

As illustrated in FIGS. 4 and 5B, the main body portion 58 of the peg 36 is elongated and generally cylindrical and extends in an upward direction 55U opposing the downward direction 55D. The main body portion 58 includes ridges 70 that extend along the main body portion 58 between a circular top 71 and the base portion 52 (FIG. 4). In the illustrated embodiment, four ridges 70 extend along the main body portion 58. In other embodiments, only one ridge may extend along the main body portion 58. In another embodiment, two opposing ridges may extend along the main body portion 58. The four ridges 70 are equally spaced about the main body portion 58 (FIG. 5B) and are shaped to receive the tool mounting portion 24 of common OMT blades and accessories 22. The circular top 71 blends into the ridges 70 to help guide OMT blades/accessories 22 onto the main body portion 58. The circular top 71 and the ridges 70 also help reinforce the peg 36.

The main body portion 58 of each peg 36 is elongated to fit multiple OMT blades/accessories 22 that are stacked or placed on top of one another. In the illustrated embodiment, the main body portion 58 is sized to receive up to five OMT blades/accessories 22. In other embodiments, the main body portion 58 is sized to receive fewer or more OMT blades/accessories 22. In some embodiments, the main body portion is configured to receive a single OMT blade/accessory to thereby reduce a depth profile of the case 10.

The main body portion 58 is also sized to inhibit OMT blades/accessories 22 from sliding off of the peg 36 when the peg 36 is supported within the case 10 (FIG. 1A) and the lid 18 is closed. More particularly, an overall length of the main body portion 58 is generally the same as (or only slightly less than) a distance between the lower surface 26 and an inner surface of the lid 18. When the lid 18 is closed, the circular top 71 of the peg 36 contacts (or is close to) the inner surface of the lid 18 such that an OMT blade/accessory 22 cannot slide off the top of the peg 36. The circular top 71 may also help support the lid 18.

Referring to FIGS. 4, 6A, and 6B, the main body portion 58 also includes one or more shelves or projections 72, 73 positioned and extending between the ridges 70. In the illustrated embodiment, the main body portion 58 includes a pair of first projections 72 and a pair of second projections 73. The projections 72, 73 are positioned partway between the base portion 52 and the circular top 71. In the illustrated embodiment, the projections 72, 73 are positioned approximately midway between the base portion 52 and the circular top 71, but are slightly closer to the base portion 52. In other embodiments, the projections 72, 73 may be positioned at other relative distances between the base portion 52 and the circular top 71, depending on the size (e.g., length) of the peg 36. The illustrated projections 72, 73 are generally semi-circular and planar. In addition, the first projections 72 extend radially further outward from the central longitudinal axis of the main body portion 58 than the second projections 73, such that the first projections 72 are generally bigger than the second projections 73.

The first projections 72 form a resting surface or mount 74 for the OMT blades/accessories 22. For example, some OMT blades/accessories have an offset or raised anchor (such as the offset second portions 24 of the OMT blades 22 shown in FIG. 1A). The resting surface 74 is configured to support the raised second portion 24 of the OMT blade 22, while the first portion 23 of the OMT blade can still lay flat on the lower surface 26 of the case 10. Since the main body portion 58 only includes two first projections 72, a different style OMT blade with an aligned or planar anchor can be positioned on the peg 36 in an orientation rotated 180 degrees relative to the OMT blade with the raised anchor. In this position, the aligned anchor can slide over the second projections 73 (which are smaller than the first projections 72) such that the entire blade can lay flat on the lower surface 26 of the case 10. The projections 72, 73, thereby, provide an option for supporting OMT blades with raised anchors or OMT blades with aligned anchors, yet still provide additional structural support between the ridges 70. In some embodiments, the peg 36 may only include the first projections 72 or may only include the second projections 73. In yet another embodiment, the peg 36 may include multiple first or second projections 72, 73 and resting surfaces 74 positioned along the upward-downward direction 55U-55D such that multiple OMT blades are supported on multiple resting surfaces 74.

Figure 9A:
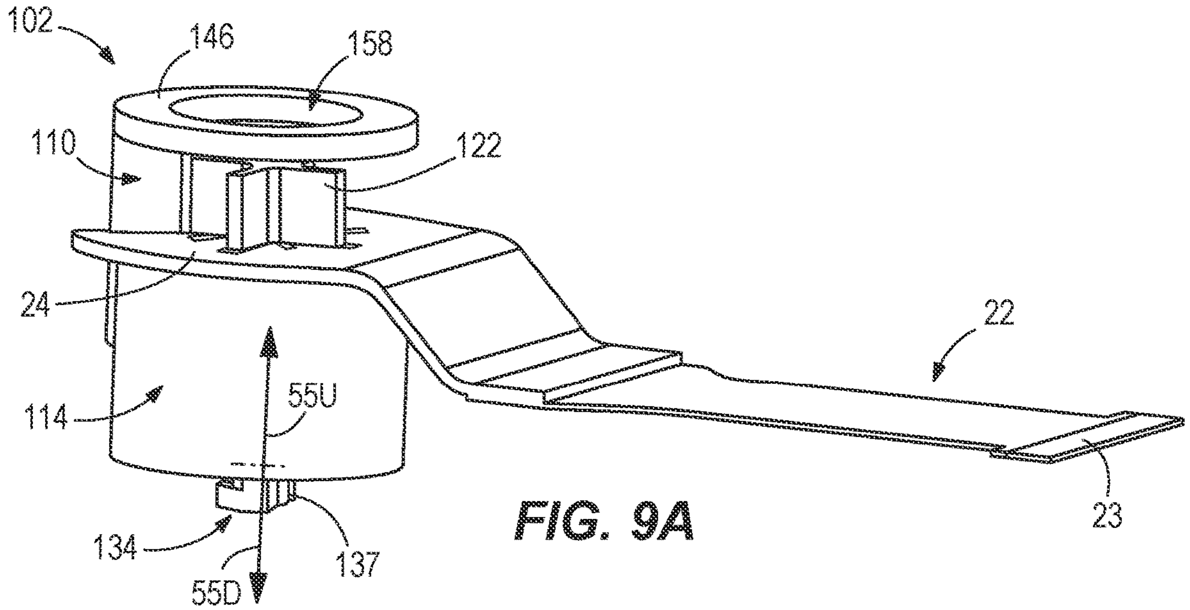
FIG. 9A is a perspective view of an alternative tool holder insert.
Figure 9B:
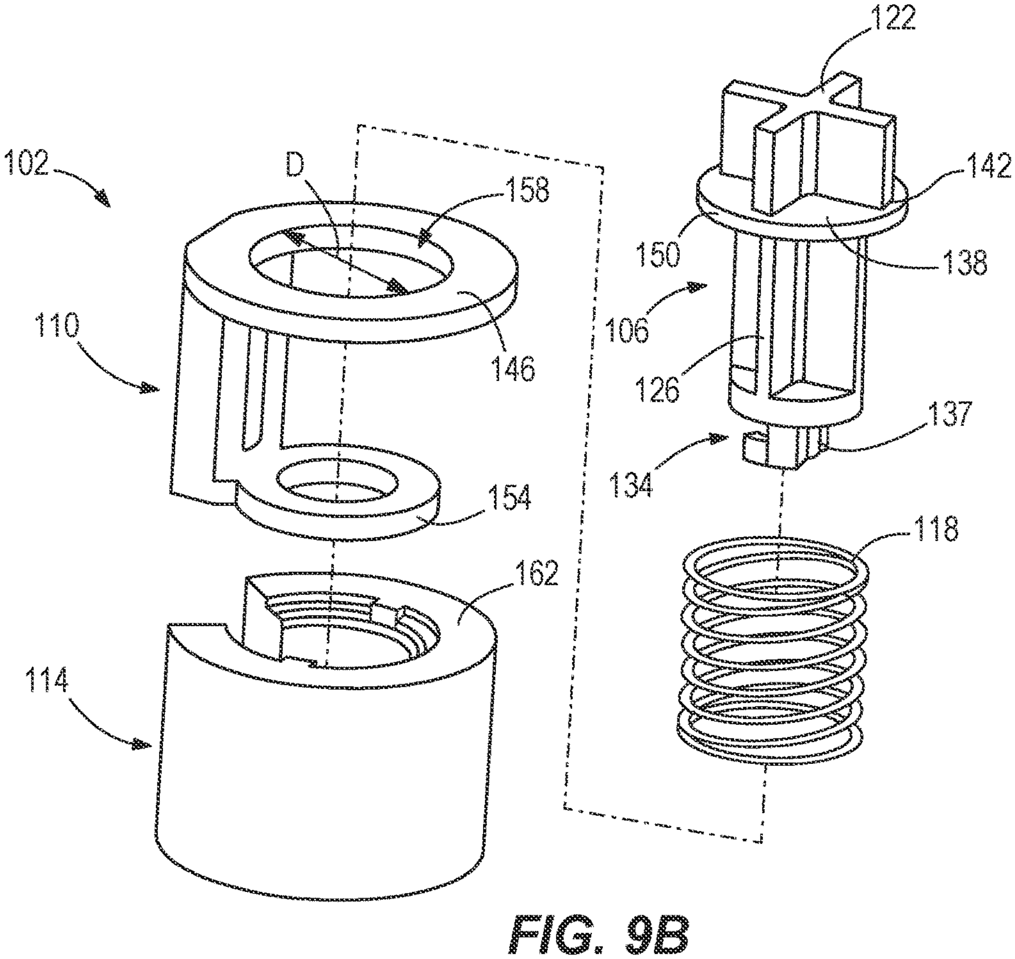
FIG. 9B is an exploded perspective view of the alternative tool holder insert of FIG. 9A.

As illustrated in FIGS. 9A and 9B, tool case 10 may also receive an alternative tool holder insert 102. The illustrated tool holder insert 102 includes a peg 106, a peg retainer 110, a retainer sleeve 114, and a spring 118. The peg 106 includes a tool mount portion 122 that is generally plus sign-shaped and extends from a main body portion 126 in an upper direction 55U (FIGS. 6B and 9A) opposite of the downward direction 55D. The tool mount portion 122 may also have other shapes such an X-shape, an octagon-shape, a star-shape, or the like. The peg 106 also includes an insert portion 134 that extends from the body portion 126 in the downward direction 55D. The insert portion 134 includes a double bayonet projection 137 that is complementary to the double bayonet channel 35 of each guide 34 of the case 10. The double bayonet projection 137 has substantially the same make and function as the double bayonet projection 37 of the peg 36. Therefore, the tool holder insert 102 may be inserted into and supported by the guides 34 in the same manner as described above for the peg 36 (FIG. 8).

Also, similar to the peg 36, the tool holder insert 102 is configured to fit multiple OMT blades/accessories 22. Specifically, the plus sign-shaped tool mount portion 122 is elongated to receive the second portion 24 of multiple OMT blades/accessories 22 that are stacked or placed on top of one another. In some embodiments, the tool mount portion 122 may receive up to four OMT blades/accessories 22. In other embodiments, the tool mount portion 122 may include fewer or more OMT blades/accessories 22. A tool support surface 138 extends radially from the peg 106 at a base 142 of the tool mount portion 122 to support the blades/accessories 22 when they are placed on the tool mount portion 122.

With continued reference to FIGS. 9A and 9B, the OMT blades/accessories 22 may be retained between the support surface 138 and a top portion 146 of the peg retainer 110 by a spring force from the spring 118. In the illustrated embodiment, the spring 118 is a coil spring. In other embodiments, the tool holder insert 102 may include alternative or additional biasing members. The spring 118 is retained between a bottom side 150 of the support surface 138 and a lower portion 154 of the peg retainer 110. The top portion 146 and the lower portion 154 of the peg retainer 110 are spaced apart such that the peg retainer 110 is U-shaped. The peg retainer 110 is translatable in the upward-downward direction 55U-55D and biased in the downward direction 55D to hold a number of the OMT blades/accessories 22 onto the plus sign-shaped tool mount portion 122. The top portion 146 of the peg retainer 110 includes and open top 158 having a diameter D. The diameter D is large enough to allow the tool mount portion 122 to extend through the open top 158 in the upwards direction 55U, yet small enough to retain the tool support surface 138.

As best illustrated in FIG. 9B, the lower portion 154 of the peg retainer 110 and the spring 118 are both housed within the retainer sleeve 114. A top surface 162 of the retainer sleeve 114 lies flush with the tool support surface 138 and provides an additional surface for the OMT blades/accessories 22 to contact when being held on the peg 106. The peg 106 and sleeve 114 are generally constrained from movement in upward-downward direction 55U-55D such that only the peg retainer 110 moves. Since the peg 106 and the sleeve 114 are constrained, the spring 118 provides spring force from the bottom side 150 of the support surface 138 on the stationary peg 106 to the lower portion 154 of the moveable peg retainer 110. In other words, a user may pull the retainer 110 away from the sleeve 114 and the peg 106 in the upward direction 55U, place the second portion 24 of the OMT blade/accessory 22 onto the plus sign-shaped tool mount portion 122, and release the retainer 110 such that the spring 118 pushes the retainer 110 in the downward direction 55D. Therefore, the top portion 146 of the peg retainer 110 is held against the OMT blade/accessory 22.

Figure 10A:
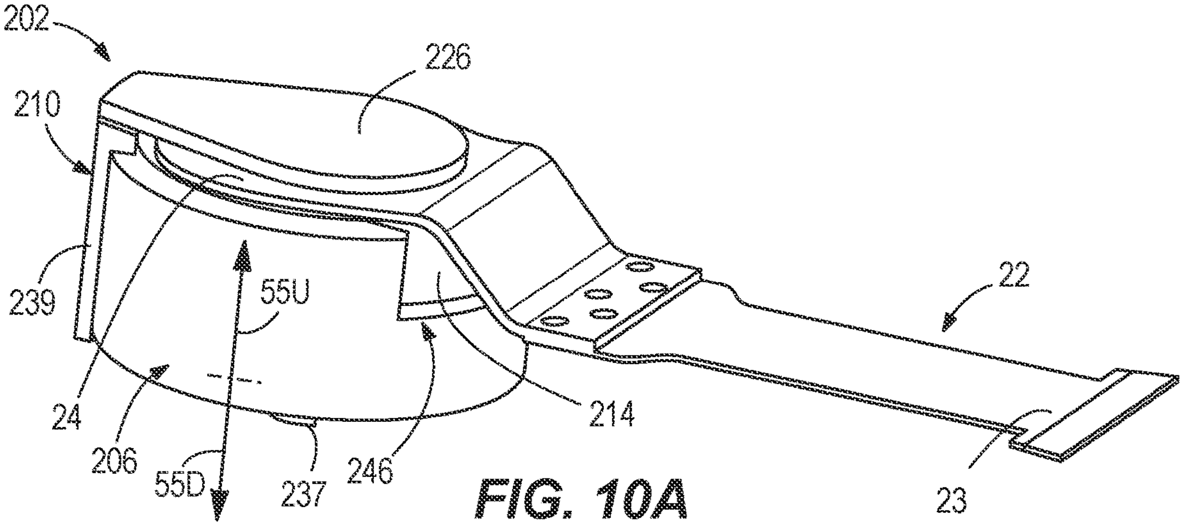
FIG. 10A is a perspective view of another alternative tool holder insert.
Figure 10B:
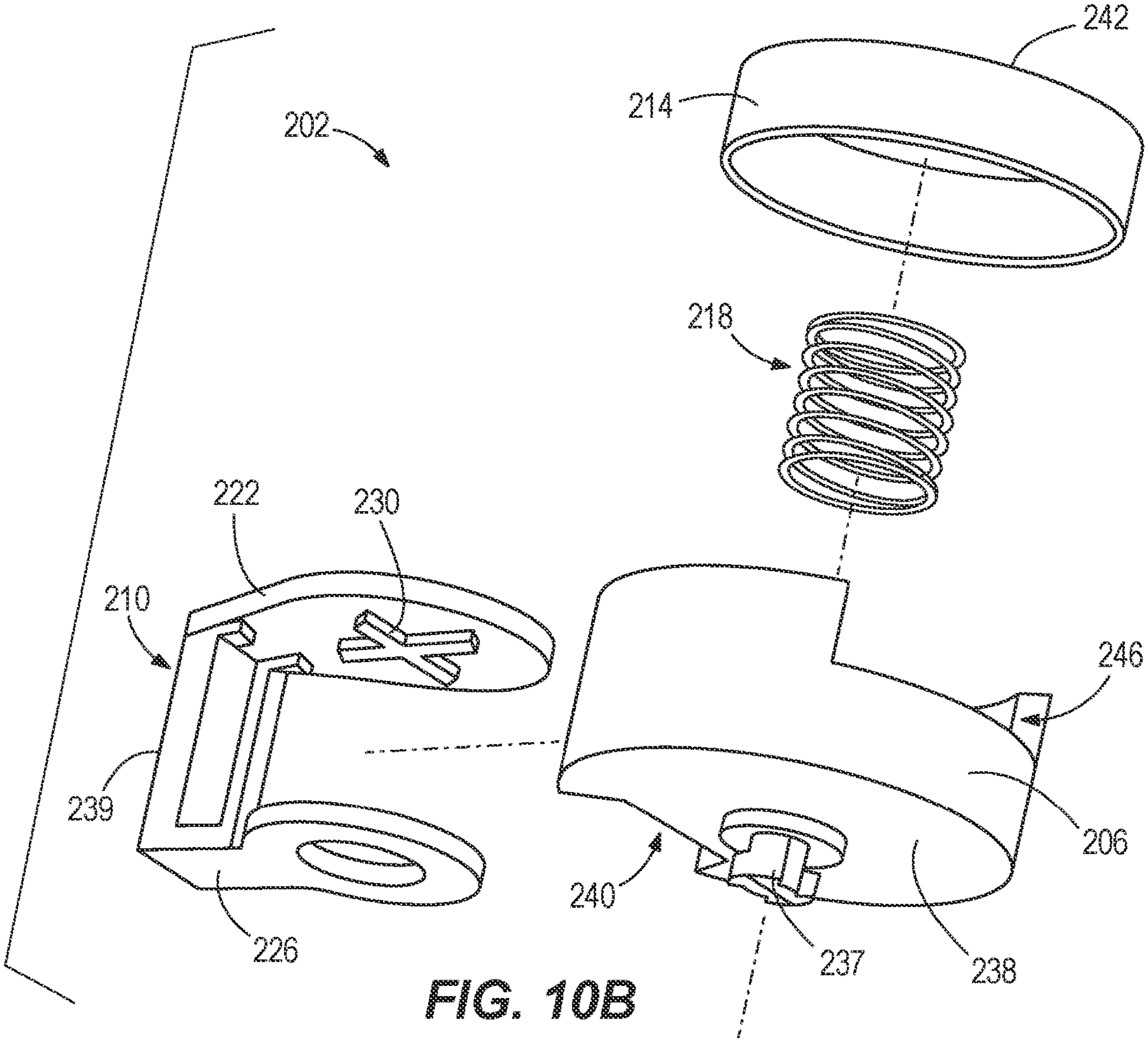
FIG. 10B is an exploded perspective view of the tool holder insert of FIG. 10A.

FIGS. 10A and 10B illustrate another alternative tool holder insert 202. The illustrated tool holder insert 202 may also be received in the guides 34, similarly to the peg 36 and the tool holder insert 102. The guides 34 may include any of the peg 36 or inserts 202 depending on a user's preference. In other words, the guides 34 are "universal" in that they may receive a variety of tool holding apparatuses including the peg 36, the tool holder insert 102 and/or the tool holder insert 202.

The tool holder insert 202 includes a casing 206, a tool retainer 210, a tool support cap 214 and a spring 218. The tool retainer 210 includes an upper portion 222 and a lower portion 226. The upper portion 222 and the lower portion 226 are spaced apart such that the tool retainer 210 is U-shaped. The upper portion 222 includes a protrusion 230 that fits into the second portion 24 of the OMT blades/accessories 22. In the illustrated embodiment, the protrusion 230 is generally plus sign-shaped, but could be have another shape, such as an X-shape. Similar to the plus sign-shaped mount portion 122 and the ridges 70, the plus sign-shaped protrusion 230 receives the second portion 24 of the OMT blades/accessories 22, which also includes a substantially X or plus sign-shape aperture for mounting to the OMT.

The casing 206 includes a double bayonet projection 237 that is complementary to the double bayonet channel 35 of each guide 34. The double bayonet projection 237 has substantially the same make and function as the double bayonet projection 37 of the peg 36. Therefore, the tool holder insert 202 may be inserted into and supported by the guides 34 in the same manner as described above for the peg 36 (FIG. 8). The tool retainer 210, cap 214 and spring 218 are housed/retained in the casing 206.

The lower portion 226 of the retainer 210 extends below the casing 206 between a lower surface 238 of the casing 206 and the double bayonet projection 237. The tool retainer 210 is therefore constrained along with the casing 206 in the upward-downward direction 55U-55D. A connecting portion 239 of the tool retainer 210 that connects the upper portion 222 and lower portion 226 fits into a first slot 240 of the casing 206 in a nesting fashion. In this way, the tool retainer 210 is inhibited from rotating relative to the casing 206.

With continued reference to FIGS. 10A and 10B, the spring 218 is compressed between the casing 206 and the cap 214 to urge the cap 214 in the upwards direction 55U. In the illustrated embodiment, the spring 218 is a coil spring. In other embodiments, the tool holder insert 202 may include alternative or additional biasing members. The top portion 222 of the retainer 210 extends above the cap 214 to inhibit the cap 214 from being pushed from the casing 206 either by a user or the spring 218, for example. The cap 214 includes a generally flat top surface 242 for supporting the OMT blades/accessories 22. The casing 206 includes a second slot 246 in a portion of the casing 206 for receiving a greater portion of the OMT blade/accessory 22.

The second slot 246 allows space for a user to press the OMT blade/accessory 22 in the downward direction 55D against the cap 214 and against the spring 218 to create space between the cap 214 and the plus sign-shaped protrusion 230. In this way, the OMT blade/accessory 22 is placed on the cap 214 between the top surface 242 and the protrusion 230. The spring 218 urges the cap 214 toward the upper portion 222 of the retainer 210 to hold the OMT blade/accessory 22 on the cap and within the plus sign-shaped protrusion 230.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described. Various features and advantages of the invention are set forth in the following claims.

The invention claimed is:

1. A tool case comprising:

a base having a lower surface, the lower surface defining a plurality of guides; and a tool holder insert supported by the base, the tool holder insert including a base portion, an insert portion extending from the base portion in a first direction, the insert portion engaging one of the plurality of guides, a main body portion extending from the base portion in a second direction that is opposite the first direction, the main body portion configured to receive an oscillating multi tool blade, and a wing extending outwardly from the base portion, the wing having a detent that engages another of the plurality of guides.

2. The tool case of claim 1, wherein the wing is a first wing and the detent is a first detent, and wherein the tool holder insert further includes a second wing extending outwardly from the base portion, the second wing having a second detent configured to engage another of the plurality of guides.

3. The tool case of claim 2, wherein the first wing and the second wing extend in opposite directions relative one another.

4. The tool case of claim 1, wherein the tool holder insert is selectively rotatable relative to the lower surface of the tool case while the insert portion of the tool holder insert engages the one of the plurality of guides to engage the detent with the another of the plurality of guides.

5. The tool case of claim 1, wherein the plurality of guides includes a plurality of double bayonet channels, and wherein the insert portion has a double bayonet projection that is received in one of the plurality of double bayonet channels.

6. The tool case of claim 1, wherein the plurality of guides are arranged in the lower surface of the tool case in rows offset relative one another.

7. The tool case of claim 1, further comprising a lid coupled to the base to selectively enclose a cavity defined by the base, wherein the tool holder insert is positioned within the cavity, and wherein an overall length of the main body portion is generally the same as a distance between the lower surface of the base and an inner surface of the lid.

8. The tool case of claim 1, wherein the main body portion includes a plurality of ridges that extend along the main body portion between the base portion and a top of the tool holder insert.

9. The tool case of claim 8, wherein the main body portion further includes a projection extending radially outwardly and between two ridges of the plurality of ridges, and wherein the projection includes a resting surface configured to support an offset anchor of the oscillating multi tool blade.

10. The tool case of claim 9, wherein the projection is a first projection that extends radially outwardly by a first amount, wherein the main body portion further includes a second projection between two ridges of the plurality of ridges that extends radially outwardly by a second amount, and wherein the second amount is less than the first amount.

11. The tool case of claim 9, wherein the projection is positioned approximately midway between the base portion and the top of the tool holder insert.

12. A tool case comprising:

- a base having a lower surface, the lower surface defining a plurality of guides; and
- a tool holder insert supported by the base, the tool holder insert including
  - a base portion,
  - an insert portion extending from the base portion in a first direction, the insert portion engaging one of the plurality of guides, and
  - a main body portion extending from the base portion in a second direction that is opposite the first direction, the main body portion including a projection forming a resting surface that is configured to support an offset anchor of an oscillating multi tool blade.

13. The tool case of claim 12, wherein the projection is one of a pair of projections, and wherein the pair of projections together form the resting surface.

14. The tool case of claim 12, wherein the projection is a first projection that extends radially outward a first amount, wherein the main body portion includes a second projection extending radially outward by a second amount, and wherein the second amount is less than the first amount.

15. The tool case of claim 12, wherein the main body portion includes a plurality of ridges that extend along the main body portion between the base portion and a top of the tool holder insert, and wherein the projection is positioned between two ridges of the plurality of ridges.

16. The tool case of claim 12, wherein the projection is positioned approximately midway between the base portion and a top of the tool holder insert.

17. The tool case of claim 12, wherein the plurality of guides includes a plurality of double bayonet channels, and wherein the insert portion has a double bayonet projection that is received in one of the plurality of double bayonet channels.

18. A tool case comprising:

- a base including a lower surface and walls extending away from the lower surface, the lower surface and the walls defining a cavity, the lower surface defining a plurality of double bayonet channels;
- a lid coupled to the base to selectively enclose the cavity; and
- a tool holder insert supported by the base and positioned within the cavity, the tool holder insert including
  - a base portion,
  - an insert portion extending from the base portion in a first direction, the insert portion having a double bayonet projection that is received in one of the plurality of double bayonet channels,
  - a main body portion extending from the base portion in a second direction that is opposite the first direction, the main body portion including a plurality of ridges that extend along the main body portion from the base portion to a top of the tool holder insert, the main body portion also including a projection between two ridges of the plurality of ridges, the projection forming a resting surface that is configured to support an offset anchor of an oscillating multi tool blade, and
  - a wing extending outwardly from the base portion, the wing having a detent that engages another of the plurality of double bayonet channels.

19. The tool case of claim 18, wherein an overall length of the main body portion is generally the same as a distance between the lower surface of the base and an inner surface of the lid.

20. The tool case of claim 18, wherein the resting surface is configured to support a plurality of stacked oscillating multi tool blades.

* * * * *